March 19, 1946.   D. SCHWARTZ   2,396,805
MULTIPLE RIBBON SPOOL
Filed Dec. 6, 1944   2 Sheets-Sheet 1
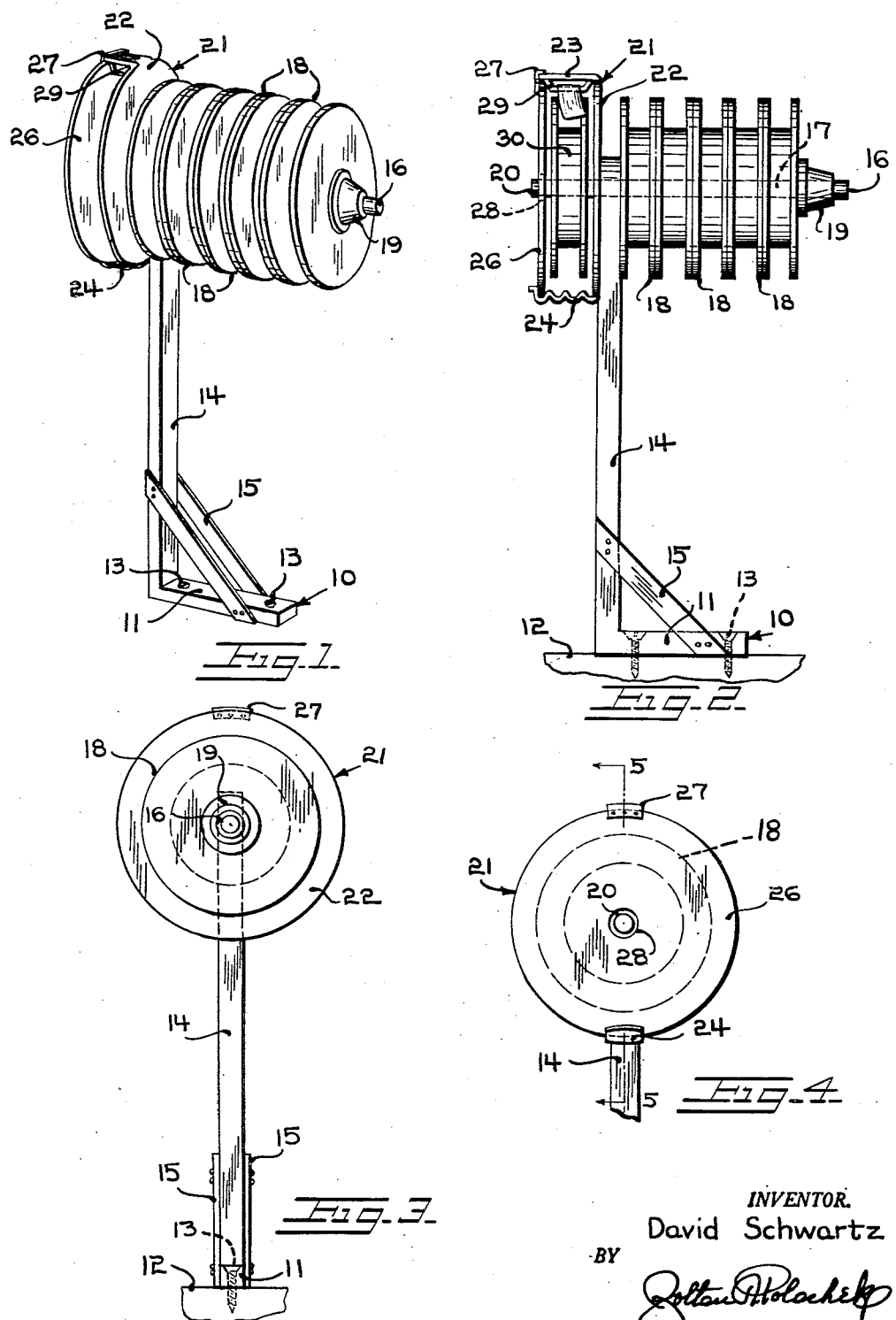
INVENTOR.
David Schwartz
BY
ATTORNEY March 19, 1946.  D. SCHWARTZ  2,396,805

MULTIPLE RIBBON SPOOL

Filed Dec. 6, 1944  2 Sheets-Sheet 2

INVENTOR.
David Schwartz
BY
ATTORNEY.

Patented Mar. 19, 1946

2,396,805

UNITED STATES PATENT OFFICE 2,396,805

MULTIPLE RIBBON SPOOL

David Schwartz, New York, N. Y.

Application December 6, 1944, Serial No. 566,810

8 Claims. (Cl. 242—55.3)

This invention relates to new and useful improvements in a multiple ribbon spool device.

More specifically, the present invention proposes the construction of a multiple ribbon spool device characterized by having a base supporting a cylindrical rod extending from opposite sides of the base, one side of the rod forming a rack for a plurality of spools and the other side forming a journal for a spool to be rotated, the journal supporting a spool housing.

Still further, it is proposed to provide the spool housing with a ribbon guide.

Another object is to provide the spool housing with a rigid inner wall and a hinged outer wall.

Another object is to provide the spool housing with flexible and adjustable means for securing the bottom of the hinged wall and for providing friction preventing the free running of the spool.

Still another object is to provide a spool housing as aforesaid in which the hinge is secured to a flexible end and adjustable wall similar to the flexible and adjustable means for securing the bottom of the hinged wall.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the device constructed in accordance with this invention.

Fig. 2 is a side view of the device.

Fig. 3 is a rear view of the device as viewed from the right of Fig. 2.

Fig. 4 is a fragmentary front view of the device.

Figure 5:
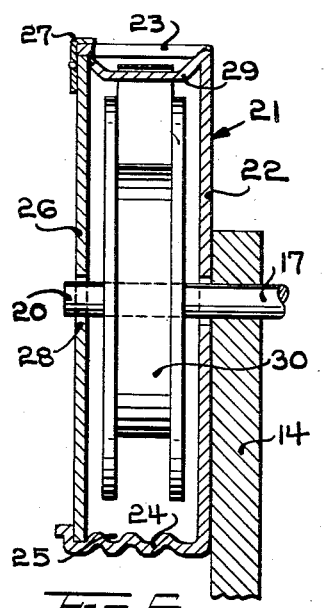
Fig. 5 is a section on the line 5—5 of Fig. 4, parts being shown in full.

The multiple ribbon spool device, according to this invention, comprises a base 10 having a bottom horizontal leg 11 adapted to be secured to a table 12 by screws 13 and a vertical leg 14, the legs being connected by braces 15 fastened thereto as by welding or by bolts.

A shaft 16 is rigidly secured in the leg 14 by being forced through an orifice therein. Shaft 16 has a supporting portion 17 at the rear side of the leg 14 of sufficient length to receive a plurality of ribbon spools 18, this portion 17 forming a storing rack for the spools. A nut 19 is provided screwed on the end of portion 17, for retaining the spools 18.

Shaft 16 also has a journal portion 20 extending forwardly of the leg 14. On this journal 20 is mounted a spool housing 21, rigidly secured to the leg 14 as by spot welding. Housing 21 has a rear circular disc 22 from the top of which extends forwardly a flange 23 and from the bottom of which extends forwardly a bellows-like flange 24 having a plurality of grooves 25, four being shown by way of example in the drawings.

The housing also includes a front circular disc 26, connected to the flange 23 by a hinge 27, disc 26 having an orifice 28 through which the journal extends. The bottom of disc 26 is adapted to be secured in one of the grooves 25, as will presently appear.

A guide 29 depends from flange 23. This guide is formed by cutting two parallel slits in the flange 23 and forcing the metal therebetween downwardly. It may also be formed, if desired, by spot welding a metal strip to the flange 23. A ribbon spool 30 is adapted to be mounted on the journal in the housing.

Figure 8:
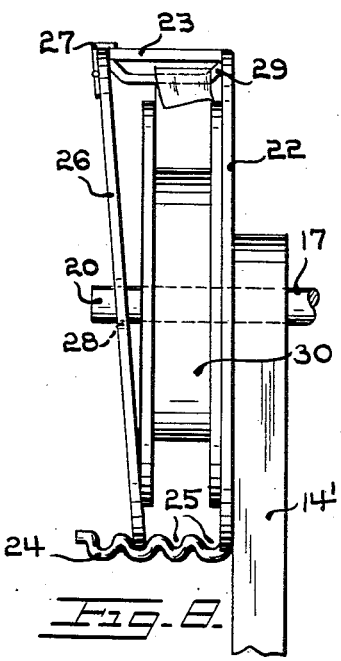
Fig. 8 is a fragmentary view, similar to Fig. 2, showing the housing with its hinged wall in adjusted friction-producing position.

The operation of the device is as follows:

Ordinarily there will be one spool in the housing and the remainder on the rack. Assuming there is no spool in the housing, the nut 16 is removed from the rack, and a spool of ribbon chosen and removed therefrom, whereupon the nut 16 is screwed back on the rack to retain the remaining spools. The door or disc 26 is then swung open around the pin of the hinge 27, the bottom of the door being released from the groove 25 in which it is disposed by pressing down on the front end of the flange 24. The spool is then inserted on the journal, the free end of the ribbon passed through the guide, and the door or disc 25 returned to position with its bottom in the outer groove 25. If the disc 26 does not engage the spool, and if it is desired to frictionally resist free running of the spool when the ribbon is unwound, the disc 26 is placed at its bottom in the second or third groove as desired, as shown in Fig. 8, whereupon the bottom of the spool is slightly squeezed between the discs, permitting the spool to be turned to unwind the ribbon but preventing the spool from free running which would result in the ribbon becoming loose.

The ribbon is pulled manually, but it may be pulled by a machine if desired. The device may be used in many services such as on a store counter or in a factory. The flange 24, which is bellows-like as aforesaid, is made of suitable metal so that it not only provides the grooves 25 but is also flexible and can give (stretch) a little to provide a spring action for generating friction when the spool of ribbon is squeezed between the discs.

Figure 9:
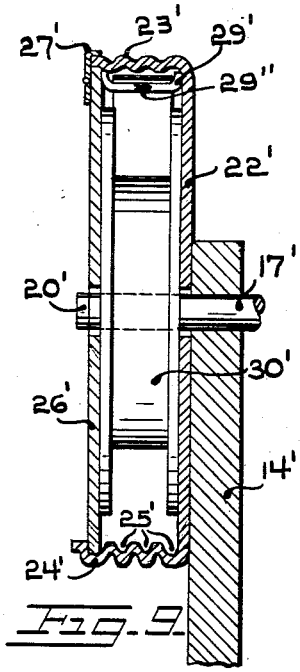
Fig. 9 is a view similar to Fig. 5 showing a device constructed in accordance with a modification of this invention.
Figure 7:
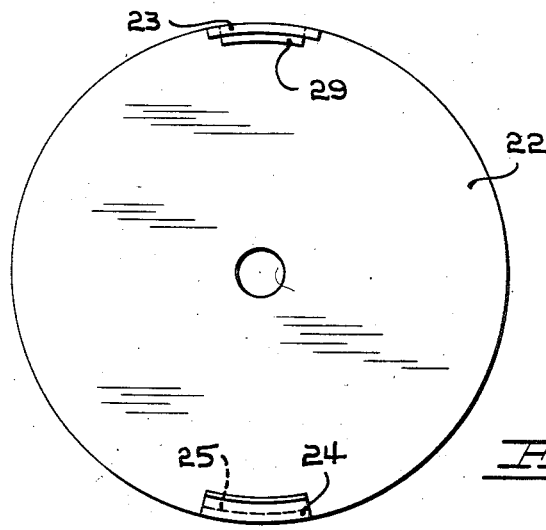
Fig. 7 is a front view of the spool housing rear wall.
Figure 6:
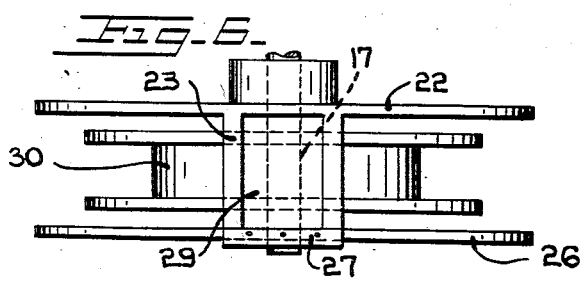
Fig. 6 is a plan of the spool housing.

A device constructed in accordance with a modification of this invention is shown in Fig. 9. It distinguishes from the device of Figs. 1–8 in that the flange 23' is also bellows-like having the same flexible action as the flange 24' so that the space between the discs may be increased to take wide spools and to squeeze the spool between the discs. The guide 29' is formed of two parts having an expansible telescoped connection 29" permitting the guide 29' to vary in length. Each of the parts of the guide 29' are spot welded to their respective supporting parts.

It is to be understood that this invention is inexpensive, economical and may be readily installed on all types of sewing machines, such as on machines used for making garments, neckties, etc. This device lasts indefinitely, without getting out of order and is a time-saving, ribbon spool-holder which may be efficiently used for saving bindings and ribbons to the last inch.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A multiple ribbon spool device comprising a base having a horizontal leg adapted to be secured to a support and a vertical leg, a shaft rigidly secured to said vertical leg and having a long rack portion extending from one side thereof and a short journal portion extending from the other side thereof, said rack portion being for supporting a plurality of ribbon spools, a housing on said journal portion including a rear disc rigidly secured to said vertical leg and having a top flange extending forwardly and a bottom flange extending forwardly, and a front disc hinged to said top flange, said bottom flange having a securing means for locking the bottom of said front disc, said journal being adapted to support a ribbon spool rotatably in said housing.

2. A multiple ribbon spool device comprising a base having a horizontal leg adapted to be secured to a support and a vertical leg, a shaft rigidly secured to said vertical leg and having a long rack portion extending from one side thereof and a short journal portion extending from the other side thereof, said rack portion being for supporting a plurality of ribbon spools, a housing on said journal portion including a rear disc rigidly secured to said vertical leg and having a top flange extending forwardly and a bottom flange extending forwardly, and a front disc hinged to said top flange, said bottom flange having a securing means for locking the bottom of said front disc, said journal being adapted to support a ribbon spool rotatably in said housing, and means on said rack portion for holding said spools thereon.

3. A multiple ribbon spool device comprising a base having a horizontal leg adapted to be secured to a support and a vertical leg, a shaft rigidly secured to said vertical leg and having a long rack portion extending from one side thereof and a short journal portion extending from the other side thereof, said rack portion being for supporting a plurality of ribbon spools, a housing on said journal portion including a rear disc rigidly secured to said vertical leg and having a top flange extending forwardly and a bottom flange extending forwardly, and a front disc hinged to said top flange, said bottom flange having a securing means for locking the bottom of said front disc, said journal being adapted to support a ribbon spool rotatably in said housing, and a ribbon guide depending in said housing from said top flange.

4. A multiple ribbon spool device comprising a base having a horizontal leg adapted to be secured to a support and a vertical leg, a shaft rigidly secured to said vertical leg and having a long rack portion extending from one side thereof and a short journal portion extending from the other side thereof, said rack portion being for supporting a plurality of ribbon spools, a housing on said journal portion including a rear disc rigidly secured to said vertical leg and having a top flange extending forwardly and a bottom bellows-like flexible flange extending forwardly, a front disc hinged to said top flange, said bottom flange having a groove for locking the bottom of said front disc, said journal being adapted to support a ribbon spool rotatably in said housing.

5. A multiple ribbon spool device comprising a base having a horizontal leg adapted to be secured to a support and a vertical leg, a shaft rigidly secured to said vertical leg and having a long rack portion extending from one side thereof and a short journal portion extending from the other side thereof, said rack portion being for supporting a plurality of ribbon spools, a housing on said journal portion including a rear disc rigidly secured to said vertical leg and having a top flange extending forwardly and a bottom bellows-like flexible flange extending forwardly, a front disc hinged to said top flange, said bottom flange having a row of grooves for selectively locking the bottom of said front disc in any of a range of positions, said journal being adapted to support a ribbon spool rotatably in said housing, and said bottom of said front disc being adapted to frictionally engage said housing ribbon spool.

6. A multiple ribbon spool device comprising a base having a horizontal leg adapted to be secured to a support and a vertical leg, a shaft rigidly secured to said vertical leg and having a long rack portion extending from one side thereof and a short journal portion extending from the other side thereof, said rack portion being for supporting a plurality of ribbon spools, a housing on said journal portion including a rear disc rigidly secured to said vertical leg and having a top bellows-like flexible flange extending forwardly and a bottom bellows-like flexible flange extending forwardly, a front disc hinged to said top flange, said bottom flange having a securing means for locking the bottom of said front disc, said journal being adapted to support a ribbon spool rotatably in said housing, said bellows-like flanges permitting relative movement between said discs to change the width of said housing to receive correspondingly different width spools.

7. A multiple ribbon spool device comprising a base having a horizontal leg adapted to be secured to a support and a vertical leg, a shaft rigidly secured to said vertical leg and having a long rack portion extending from one side thereof and a short journal portion extending from the other side thereof, said rack portion being for supporting a plurality of ribbon spools, a housing on said journal portion including a rear disc rigidly secured to said vertical leg and having a top bellows-like flexible flange extending forwardly and a bottom bellows-like flexible flange extending forwardly, a front disc hinged to said top flange, said bottom flange having a securing means for locking the bottom of said front disc, said journal being adapted to support a ribbon spool rotatably in said housing, said bellows-like flanges permitting relative movement between said discs to change the width of said housing to receive correspondingly different width spools, said securing means being a row of grooves formed by the bellows of said lower flange.

8. A multiple ribbon spool device comprising a base having a horizontal leg adapted to be secured to a support and a vertical leg, a shaft rigidly secured to said vertical leg and having a long rack portion extending from one side thereof and a short journal portion extending from the other side thereof, said rack portion being for supporting a plurality of ribbon spools, a housing on said journal portion including a rear disc rigidly secured to said vertical leg and having a top bellows-like flexible flange extending forwardly and a bottom bellows-like flexible flange extending forwardly, a front disc hinged to said top flange, said bottom flange having a securing means for locking the bottom of said front disc, said journal being adapted to support a ribbon spool rotatably in said housing, said housing further having a two-part telescoped guide for the ribbon of said housing spool supported from said top flange.

DAVID SCHWARTZ.